Aug. 9, 1966

R. SEIDE 3,265,453

RECORD STORAGE MEANS

Filed June 12, 1963

INVENTOR
RAY SEIDE
BY Robert W. Siddell
ATTORNEY.

3,265,453
Patented August 9, 1966

3,265,453

RECORD STORAGE MEANS

Ray Seide, 17 W. 70th St., New York, N.Y.

Filed June 12, 1963, Ser. No. 287,365
4 Claims. (Cl. 312—13)

Figure 1:
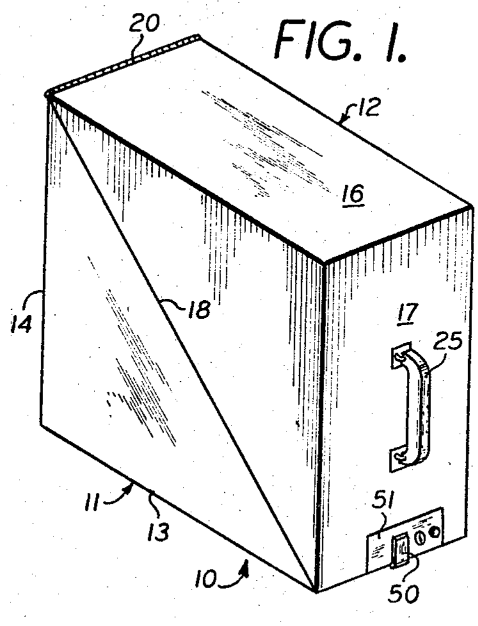

This invention relates to the art of storing sound-reproducing records, more particularly to improved means for portably storing a plurality of sound-reproducing records so as to implement the ease with which they may be maintained and carried about in a secure protected condition, while at the same time facilitating the removal and return of the records from their stored condition.

A variety of situations exist in which it is desired to maintain a number of sound-reproducing records in a portable group, so that a group of these records may be carried about from place to place available for use. Since sound-reproducing records are relatively delicate, subject to being damaged by excess surface contact, heat, or the accumulation of foreign matter on the surface thereof, it is desirable that these records be maintained during periods of non-use in a relatively enclosed protected condition. To this end, record jackets have been evolved consisting essentially of an envelope within which the record may be encompassed with the faces of the records maintained in contact with the interior of the envelope to prevent dirt from accumulating thereon. The envelope is made relatively rigid to provide protection of the enveloped or jacketed record. Where a plurality of these jacketed records are to be carried about, and stored during periods of non-use, the jacketed records are generally enclosed within a carrying case conventionally in the nature of a box-like container with a handle thereon. The use of the conventional box-like container for carrying jacketed records presents problems in that when any given record is removed from the case, it is removed along with its jacket, and thereafter the record is removed from the jacket, with the jacket being left outside of the container, or re-inserted in the container. This handling of the jacket results in relatively rapid deterioration thereof with a subsequent loss of protection for the record. Where the record jacket is re-inserted into the container after the record has been removed therefrom, upon attempting to re-insert the record in the jacket the jacket must again be removed from the container requiring the manipulative steps involved in selecting the empty jacket from the group in the container.

It is with the above problems and desiderata in mind that the present means, including both method and apparatus, have been evolved. The novel means permit portable storing of jacketed records so as to implement the facility with which the jacketed records may be maintained and protected in any desired grouping, with the records readily available for use, and readily positionable within the case for storage.

It is accordingly among the objects of this invention to provide improved portable record storage means.

Another object of this invention is to provide an improved record storage case which in the closed position implements the ready portability of a group of records, and in the open position provides ready access to the records to facilitate their removal from the case for use, and re-insertion in the case after use.

A further object of the invention is to provide an improved record storage case for jacketed records in which removal of a selected record from its jacket for use does not necessitate removal of the jacket from the case.

A further object of the invention is to provide an improved record case for jacketed records with jacket gripping means for securing the jacket in the carrying case.

These and other objects of the invention which will be made hereinafter apparent are achieved by providing an improved record carrying case formed by a container diagonally separable into a lower base component and an upper cover component. The base component and the cover component are hingedly joined together, and a pivot rod is extended at an upper corner of the base component of the container. Pivotally mounted on the pivot rod is a jacket-gripping connector adapted to engage the corner of a record jacket so that the record jacket may be pivoted about the pivot rod from the container base into the container cover when the container cover is separated from the container base. In use when the container cover is separated from the container base, the container cover will form, in elevation, with the container base a pyramidal construction separated by the end walls of the container which when the container is closed are at opposed ends thereof, but which lie in substantially abutting relationship when the container is in the open position. As a result of this arrangement of the container cover, and the container base, after any given jacketed record is selected from the group stored in the base, the jacket from the record is maintained in the open container cover pending return of the record to the jacket.

A feature of the invention resides in the novel jacket connector employed for pivotally mounting a record jacket within the novel container case. The jacket connector is formed with separated bearing means joined by slide means so as to permit pivoting of the jacket over the container hinge.

Figure 3:
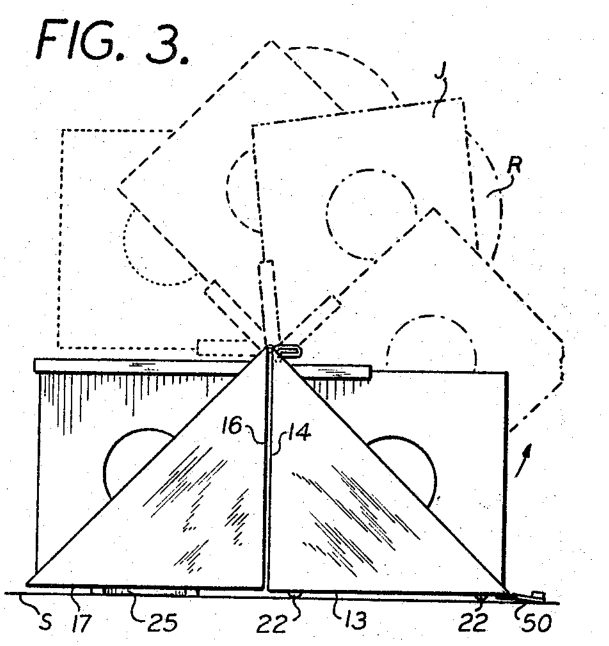
Figures 2, 4:
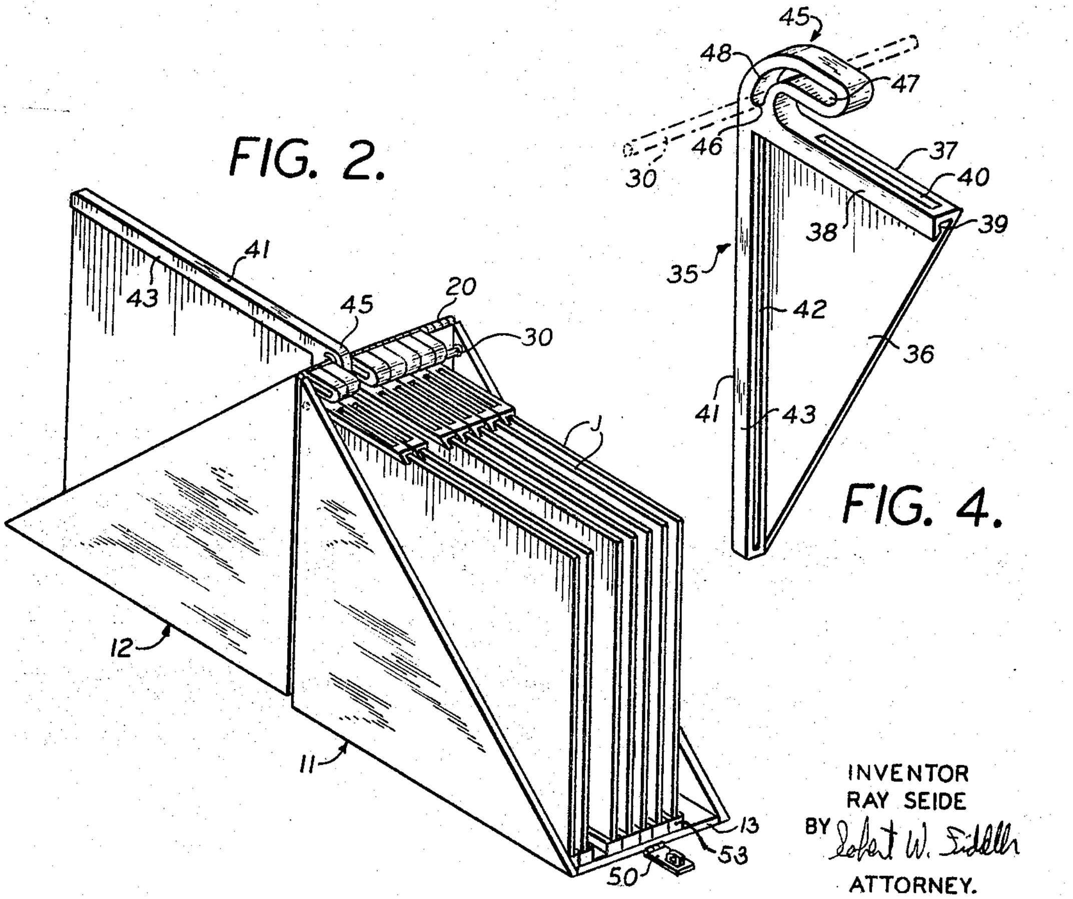

The specific details of a preferred embodiment of the invention and their mode of functioning will be made most manifest and particularly pointed out in clear, concise and exact terms in conjunction with the accompanying drawings wherein:

FIG. 1 is a perspective view of the novel record carrying case shown in closed position; and FIG. 2 is a perspective view of the carrying case of FIG. 1 shown in open position with a selected record jacket removed from its storage position within the container base to a position in the container cover indicating that a record is being used; and FIG. 3 is a side elevational view of the record carrying case in open position showing the movement of a selected record jacket from its storage position to its used position; and FIG. 4 is an enlarged perspective view of the novel jacket connector employed for positioning a jacketed record in the carrying case.

Referring now more particularly to the drawings, like numerals in the various figures will be employed to designate like parts.

As seen in the drawings the novel record carrying case 10 comprises a container diagonally separable into a lower base component 11 and an upper cover component 12. Base component 11 is formed with a base wall 13 and upstanding end wall 14, while cover component 12 is formed with a top wall 16 and vertically extending end wall 17. The side walls of the container base and cover are of a triangular configuration as illustrated mating along diagonal 18. Container base 11 is hinged to container cover 12 by means of pivot hinge 20 as best seen in FIGS. 1 and 2. Attached to base wall 13 are base feet 22, as best seen in FIG. 3. Secured to container cover end wall 17 is a handle 25 which in the illustrated embodiment of the invention may be folded down to lie against the end wall 17 so as to extend from the end wall a distance equal to the height of base feet 22, as best seen in FIG. 3. It will be understood that a variety of different types of handles may be employed which will extend only a height equal to that of base feet 22 when the container cover is opened.

Mounted between the side walls of container base 11 at an upper corner thereof, as best seen in FIGS. 2 and 3 is a pivot rod 30 preferably formed of steel or the like rigid material. Positioned for pivoting on pivot rod 30 is jacket gripping connector 35 as best seen in FIG. 4. The jacket gripping connector 35 is formed with a jacket engaging plate 36 here shown as of a triangular configuration with two sides thereof extending at right angles to each other. In the orientation of connector 35 shown in FIG. 4, the upper edge 37 of plate 36 is formed with a gripping flange 38 arranged as the leg of a channel 39 within which the upper edge of a record jacket may be positioned. An opening 40 is formed in channel 39 through which any identifying indicia on the spine of a record jacket may be viewed. Vertical leg 41 of the triangle, forming plate 36 is provided with a channel 42 having a jacket engaging gripping flange 43 adapted to engage a vertical edge of the jacket as viewed in FIGS. 2 and 3. Flanges 38 and 43 are preferably inclined towards the plate 36 to improve jacket gripping. In the illustrated embodiment of the invention channel 42 is shown as of a length equal to that of the side of a record jacket. It will however be understood that any length channel may be employed which will effect jacket gripping.

At the right angle apex of the triangle forming connector plate 36 a pivot member 45 is formed with spaced bearing surfaces 46 and 47 at the end of a slideway 48. Slideway 48 is of a right angle configuration accommodating pivot rod 30. The vertical leg of slideway 48 as viewed in FIG. 4 is equal in length to the distance between the end wall 14 and cover end wall 17 as measured from the surfaces of said walls facing into the case, while the length of the horizontal leg of the slideway 48 as viewed in FIG. 4 is equal to the distance between the top of the hinge 20 and the top of the record jacket when positioned in the base 11 for a reason to be made hereinafter more apparent.

A latch 50 is hinged to base wall 13 for engagement with mating latch detent 51 on end plate 17 in container cover 12 to permit locking of the container components in closed position. Any one of a variety of different types of closure members may of course be employed.

Jacket closing channels 53 of rubber or the like resilient material may be arranged on the inner surface of container base wall 13 to close off and cushion the jackets held within the case.

*Operation*

In use, the aforedescribed record case 10 is opened to the position illustrated in FIG. 3, at which time the record jackets J are inserted beneath flanges 43 and 38 into channels 39 and 42 respectively on connector plate 36, with the normally open end of the jacket facing the bottom wall 13 of container base 11. In the illustrated embodiment of the invention, as shown in FIG. 2 jacket closing channels 53 are arranged to loosely accommodate the lower open end of the jackets J, as seen in FIG. 2. After a desired number of record jackets are enclosed within the case, the number being limited only by the number of connectors 35 available and subject to accommodation within the case, the case is closed to the position illustrated in FIG. 1 and is readily available for carriage to any desired position.

When it is desired to use any of the records contained within the case, the container base 13 is rested on a suitable surface S such as a floor, table, or the like, and the container cover 12 is opened by rotating same about hinge 20 to the position illustrated in FIG. 3 with end wall 16 of the container cover lying against the end wall 14 of base component 11, and with handle 25 positioned so as to maintain cover wall 17 in a plane with base wall 13, as viewed in FIG. 3.

Thereafter when it is desired to employ any given record contained within the case, the jacket J containing the record is moved out of its position within container base 11 along the lines shown by the dot dash position in FIG. 3 so as to expose the open bottom of the record jacket, at which time the record may be removed therefrom. After removal of the record R from the bottom of the jacket J the jacket is continued in its pivotal motion about pivot rod 30 to a position in container cover 12 to the left as seen in FIGS. 2 and 3.

It will be noted that connector 35 implements this pivotal motion since at the start of pivoting the bearing surface 46 engages pivot rod 30 for normal pivotal motion. As the pivotal motion of the connector in its associated jacket J continues, slideway 48 moves along rod 30 until bearing surface 47 contacts the rod 30. As heretofore described the slideway is contoured so as to provide the necessary clearance for the jacket move over the hinge 20.

It is thus seen that novel means have been provided for hingedly securing the record jacket in position within the record case, and an improved record case has been provided permitting opening of the case to accommodate the records in their associated jackets in a group prior to use, and in a group during use, with the jacket being made available for removal and reinsertion of any record therein.

The above disclosure has been given by way of illustration and elucidation, and not by way of limitation, and it is desired to protect all embodiments of the herein disclosed inventive concept within the scope of the appended claims.

What is claimed is:

1. A record carrying case comprising: a container diagonally separable into a lower base component and an upper cover component; a pivot rod at an upper corner of the base component of said container; a jacket gripping connector pivoted on said pivot rod; and engaging means formed by a channel on said connector adapted to grip an edge of a record jacket, whereby the jacket may be moved out of a storage position in the base component of the container to the cover component when the cover component is separated from the base component.

2. A record carrying case as in claim 1 in which said jacket gripping connector comprises: a slideway slideably engaging said pivot rod; a first pivot bearing at one end of said slideway upon which the record jacket is pivoted away from the lower base component; and a second pivot bearing at another end of said slideway upon which said jacket is pivoted into the upper cover component when the cover component is moved to a position exposing the record jackets for use.

3. A record carrying case as in claim 1 in which the base component is formed with supporting legs; and the cover component is formed with a handle which extends from the cover a distance equal to the height of said legs when the cover is opened.

4. A record carrying case as in claim 1 in which said channel has an opening therein through which identifying indicia on the gripped edge of the record may be viewed.

(References on following page)

References Cited by the Examiner

UNITED STATES PATENTS

| | | | |
|---|---|---|---|
| 1,403,939 | 1/1922 | Cox | 312—13 |
| 1,435,036 | 11/1922 | Weis | 312—12 |
| 1,490,422 | 4/1924 | Frank | 312—10 |
| 1,835,381 | 12/1931 | Collantes | 129—16.7 |
| 1,878,659 | 9/1932 | Bader | 312—14 |
| 2,047,339 | 7/1936 | Thomas | 221—73.5 |
| 2,165,157 | 7/1939 | Smith | 129—16.7 |
| 2,463,450 | 3/1949 | Wisner | 206—62 X |
| 2,763,524 | 9/1956 | Beers | 312—13 |

FOREIGN PATENTS

| | | |
|---|---|---|
| 499,616 | 3/1951 | Belgium. |
| 690,257 | 6/1930 | France. |
| 911,189 | 3/1946 | France. |
| 544,382 | 2/1932 | Germany. |
| 589,187 | 6/1947 | Great Britain. |

CLAUDE A. LE ROY, *Primary Examiner.*

FRANK B. SHERRY, *Examiner.*

A. FRANKEL, *Assistant Examiner.*